UNITED STATES PATENT OFFICE.

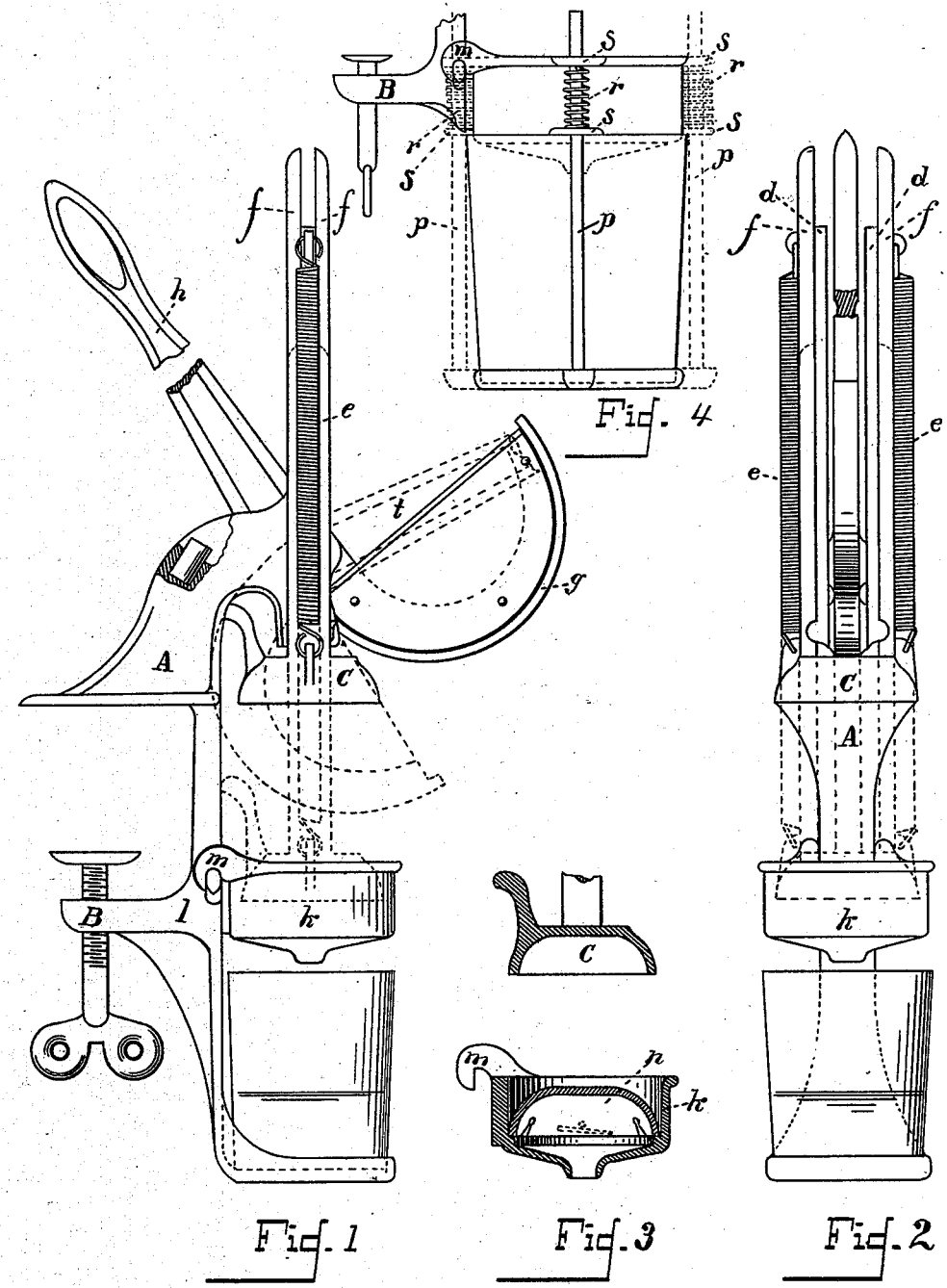

NATHAN LEVY, OF AUBURN, NEW YORK.

LEMON-SQUEEZER.

SPECIFICATION forming part of Letters Patent No. 413,725, dated October 29, 1889.

Application filed June 21, 1889. Serial No. 315,062. (No model.)

*To all whom it may concern:*

Be it known that I, NATHAN LEVY, of the city of Auburn, New York, have invented certain new and useful Improvements in Lemon-Squeezers, of which the following is a description, reference being had to the accompanying drawings, forming part of this specification.

In the drawings, Figure 1 is a side view. Fig. 2 is a front view. Fig. 3 shows details of the cup and plunger, and Fig. 4 shows looking-glass supporter.

My invention consists in certain new constructions and combinations of parts of a squeezer for lemons and other fruits, whereby its usefulness and ease of operation are increased.

My invention consists of a main frame A, provided with a clamping device for the easy securement of it to a table or shelf, and having as a part of said frame a pair of vertical parallel guides $d\ d$, upon which slide the parallel guiding-stems $ff$ of the plunger C, which is driven downward by a cam $g$, operated by a handle $h$. (The dotted lines of Figs. 1 and 2 indicate these parts in their depressed position.) A squeezing-cup K receives the fruit to be squeezed and sustains it against the pressure of the plunger, being hung to the main frame by suitable lugs and hooks $l$ and $m$. Within the cup K, I place a false bottom $n$, which is convex on its top and slotted, to allow juice to pass it. The plunger C, I make concave on its lower surface, so as to fit said false bottom $n$. I also apply a cup or glass-supporting device to my invention in either of the ways shown in Figs. 1 and 2, which show a bracket constructed upon the main frame to hold the glass, or as shown in Fig. 4, in which the solid lines show a side view and the dotted lines indicate its appearance as shown by a front view. This device consists of a pair of sliding rods $p\ p$, bearing a glass-supporting ring at their lower extremities and guided by and through lugs $s\ s$ on the cup K. Springs $r\ r$ hold upward, so that the glass sets against the cup K; but it may be drawn downward to disengage and remove it.

Within the cam $g$, and subtending its arc, I apply a knife $t$, and by inserting a lemon or other object to be cut between this knife and the parallel guides $d\ d$ and pressing the handle $h$ downward the object may be cut, as by a shears, between the knife and the ways $d\ d$, after which, reversing the motion of the handle $h$ and placing the lemon in the cup K, the plunger is operated to squeeze it.

Having thus described my invention, what I claim as new, and desire to secure by Letters Patent, is—

1. In a lemon-squeezer, the combination of the squeezing-cup K, plunger C, provided with parallel stems $ff$, the parallel guides $d\ d$ for said stems, and the cam $g$, provided with the knife $t$ at its back and pivoted between said parallel guides, and having an actuating-handle $h$, substantially as described.

2. In combination with the frame A, having guides $d\ d$, the plunger C, having a concave end and parallel stems $ff$, and the squeezing-cup K, provided with a convex false bottom $n$, and the cam $g$, provided with the knife $t$ and pivoted to said frame.

3. In a lemon-squeezer, the squeezing-cup K, provided with guiding-lugs $s\ s$, rods $p\ p$, springs $r\ r$, and glass-supporting ring at the lower extremities of said rods, in combination with a plunger C and actuating-cam $g$.

NATHAN LEVY.

Witnesses:
FREDERICK I. ALLEN,
GEORGE W. NELLIS.